United States Patent
Teng

(10) Patent No.: US 7,003,623 B2
(45) Date of Patent: Feb. 21, 2006

(54) SOLID STATE DISK ON MODULE WITH HIGH SPEED DATA TRANSMISSION

(75) Inventor: Wei Kuang Teng, Taipei (TW)

(73) Assignee: Power Quotient International Co., Ltd., Taipei Hsien (TW)

( * ) Notice: Subject to any disclaimer, the term of this patent is extended or adjusted under 35 U.S.C. 154(b) by 155 days.

(21) Appl. No.: 10/372,106

(22) Filed: Feb. 25, 2003

(65) Prior Publication Data

US 2004/0103242 A1    May 27, 2004

(30) Foreign Application Priority Data

Nov. 27, 2002  (TW) .............................. 91219089 U

(51) Int. Cl.
*G06F 12/00*    (2006.01)

(52) U.S. Cl. ....................... 711/104; 711/103; 711/100; 711/154; 714/5

(58) Field of Classification Search ................ 711/104, 711/103, 100, 154; 714/5
See application file for complete search history.

(56) References Cited

U.S. PATENT DOCUMENTS

| | | | |
|---|---|---|---|
| 6,484,290 B1 * | 11/2002 | Chien et al. .................... | 716/1 |
| 6,496,900 B1 * | 12/2002 | McDonald et al. .......... | 711/112 |
| 6,741,502 B1 * | 5/2004 | Cernea .................. | 365/185.29 |
| 6,811,427 B1 * | 11/2004 | Garrett et al. .............. | 439/378 |
| 6,843,674 B1 * | 1/2005 | Young ......................... | 439/248 |
| 2002/0087898 A1 * | 7/2002 | Bormann et al. ........... | 713/300 |
| 2004/0044705 A1 * | 3/2004 | Stager et al. ............... | 707/204 |

* cited by examiner

*Primary Examiner*—Stephen C. Elmore
(74) *Attorney, Agent, or Firm*—Troxell Law Office, PLLC

(57) ABSTRACT

IDE interface used in the conventional solid state disk on module is an interface for data transmission. However, the speed of date transmission with the IDE interface becomes slower since the standard of a faster SATA interface has been created. Therefore, how to design a solid state disk on module with high speed transmission by means of the developed SATA interface is a latest trend of the new product design. The present invention discloses a circuit structure, which can enhance the data transmission speed of the solid state disk on module with the SATA interface.

4 Claims, 3 Drawing Sheets

SOLID STATE DISK ON MODULE WITH HIGH SPEED DATA TRANSMISSION

BACKGROUND OF THE INVENTION

1. Field of the Invention

The present invention relates to a solid state disk on module with high speed data transmission, and particularly to a solid state disk on module, which utilizes serial ATA interface for data transmission.

2. Description of Related Art

The IDE interface being used as a data transmission interface of the solid state disk on module has been applied in various industrial computer systems. However, comparing to a new data transmission interface-Serial ATA, the IDE interface provides relatively slower data transmission speed because the transmission speed of Serial ATA has reached to 1.5 Gbits/sec and it will become 6.0 Gbits/sec. Hence, the data bank provides such a high speed that it has greatly overrode the transmission speed of the conventional parallel type IDE interface. (The speed of ultra ATA is possible to reach 100 Mbytes/sec).

Accordingly, for the computer periphery equipment, how to increase the transmission speed of the solid state disk on module and to be compatible with the interface of the industrial computer so as to afford the user a better application and meet our operation habit is a subject worth us to care.

SUMMARY OF THE INVENTION

From the preceding analysis of deficiencies of the prior art, the IDE interface has a limited transmission speed so that the data transmission speed is unable to be increased effectively and another bottleneck is the access speed of the flash memory is limited. In order to overcome the preceding shortcomings thoroughly, the IDE interface has been removed from the solid state disk on module in the present invention and a high speed transmission interface, Serial ATA, is adopted in the computer system instead. Meanwhile, in order to enhance the data access of the flash memory in addition to Serial ATA interface being utilized to increase the transmission speed in the interface passage greatly, a novel circuit structure has been disclosed accompanying renewal preceding interface specification such that the data transmission speed of the solid state disk on model can be increased tremendously.

BRIEF DESCRIPTION OF THE DRAWINGS

The present invention can be more fully understood by reference to the following description and accompanying drawings, in which.

DETAILED DESCRIPTION OF THE PREFERRED EMBODIMENT

Figure 1:
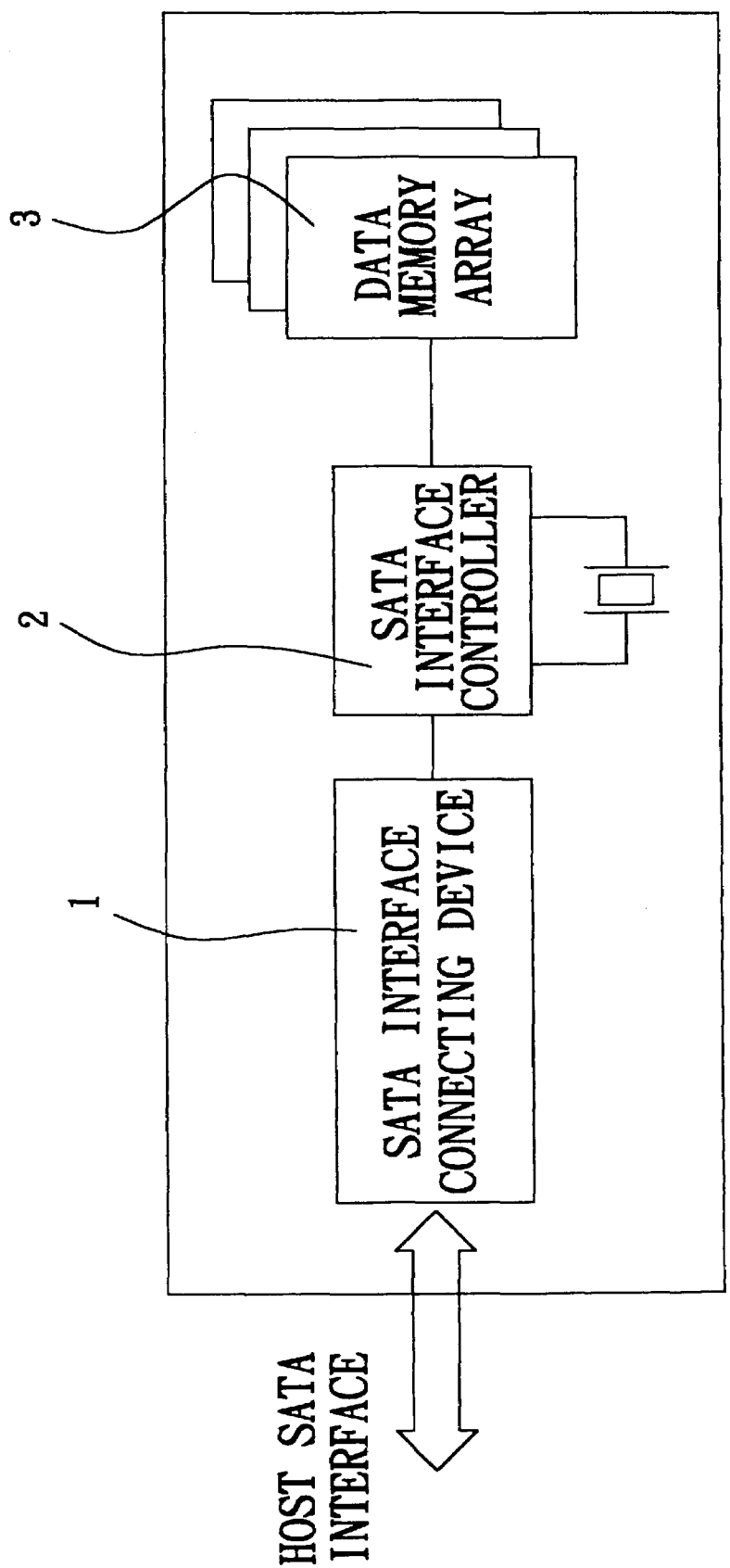
FIG. 1 is a block diagram of a SATA solid state disk on module according to the present invention.

Referring to FIG. 1, a block diagram of a solid stated disk on module according to the present invention is illustrated. When a signal is transmitted to a Serial Advance Technology Attachment (SATA) interface controller 2 via a SATA interface connecting device 1, the SATA signal can be transferred as digital data with the interface controller 2 so as to be transmitted to and stored in a memory array 3 and vise versa. That is, the digital data stored in the memory array 3 is taken out as soon as a data read request from the host is received by the interface controller 2 and the digital data is transferred as the SATA signal format so as to be sent to the host via the SATA interface connecting device 1 such that the operation of data read can be completed.

Although the solid state disk on module with high speed interface shown in FIG. 1 has been disclosed in the present invention, the feature of high speed thereof is incapable of being brought into play sufficiently due to the flash memory providing limited speed of reading and writing. In order to enhance the feature of high speed, it is necessary to improve the system illustrated in FIG. 1.

Figure 2:
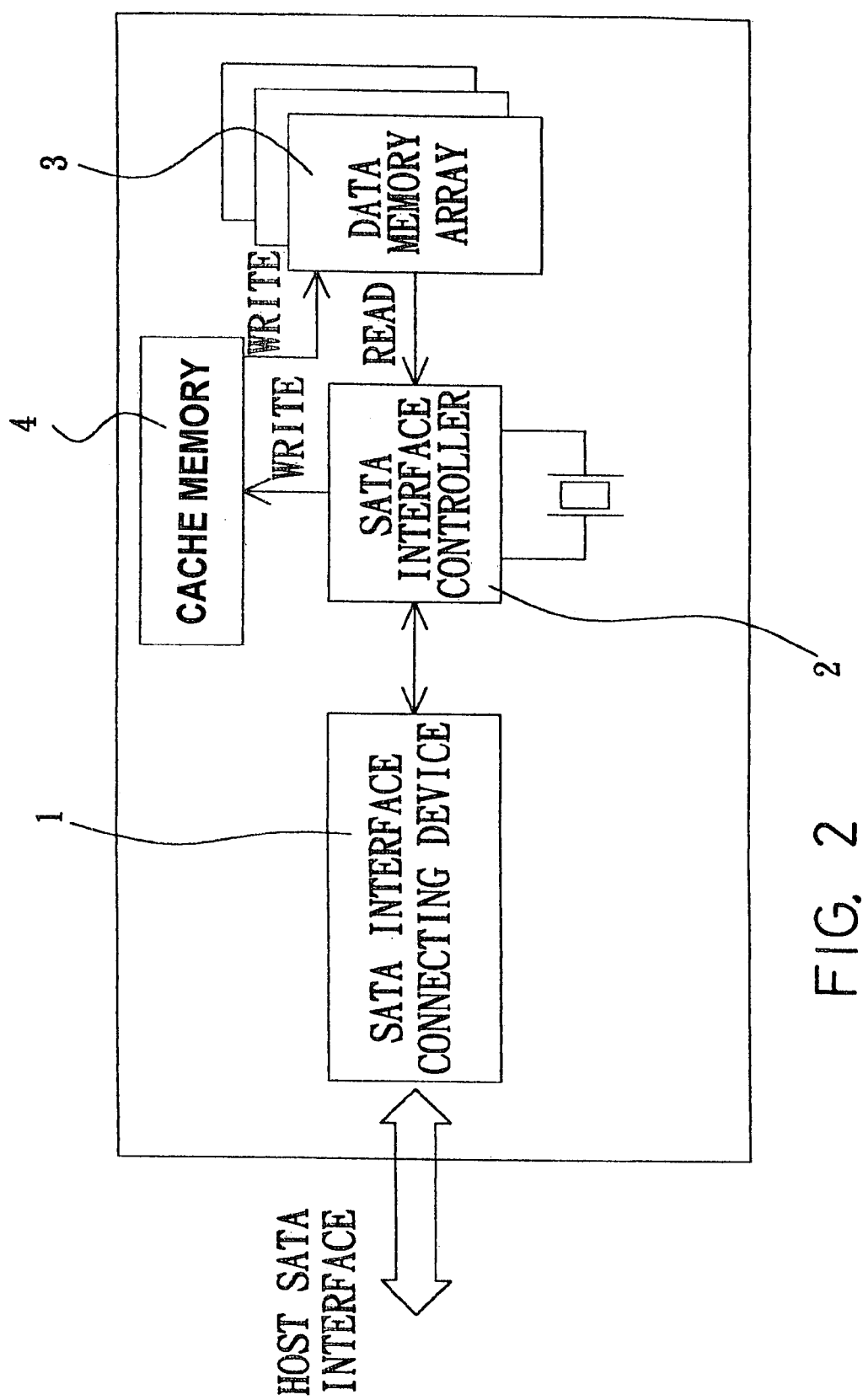
FIG. 2 is a block diagram of a high speed SATA solid disk on module according to the present invention.

Referring to FIG. 2, a revised block diagram is shown and the difference of FIG. 2 from FIG. 1 is a circuit of cache memory 4 is added. That is, the data is written into the cache memory 4, which has a faster writing speed, by the interface controller 2 before the data being written into the memory array 3 and the interface controller 2 further notifies the system that the operation of data read has been completed already. Thus, the data can be written into the memory array 3 from the cache memory 4 during a time interval before a next instruction of the system being received. In this way, the waiting time, which the system has to spend, can be shortened so the job done by the system can be completed much earlier than expected.

Besides, the SRAM is usually used as the cache memory and the data temporarily stored in the SRAM may become damage or lost in case of an accidental blackout and the data still in the SRAM. Hence, in order to solve the preceding problem, a non-volatilized memory such as Magnetic Random Access Memory (MRAM) or a Ferroelectric RAM (FeRAM) is used for being written in data instead of the SRAM because of the non-volatilized memory providing a feature of not volatilizing data as the flash memory does and having an advantage of fast recording. Hence, it is possible for the present invention not only to write in data speedily as the SRAM does but also to prevent the data being lost in case of blackout accidentally. Once, the power is supplied again, the interface controller 2 can \write the data temporarily stored in the non-volatilized memory into the flash memory array 3 to complete unfinished operation due to blackout.

Figure 3:
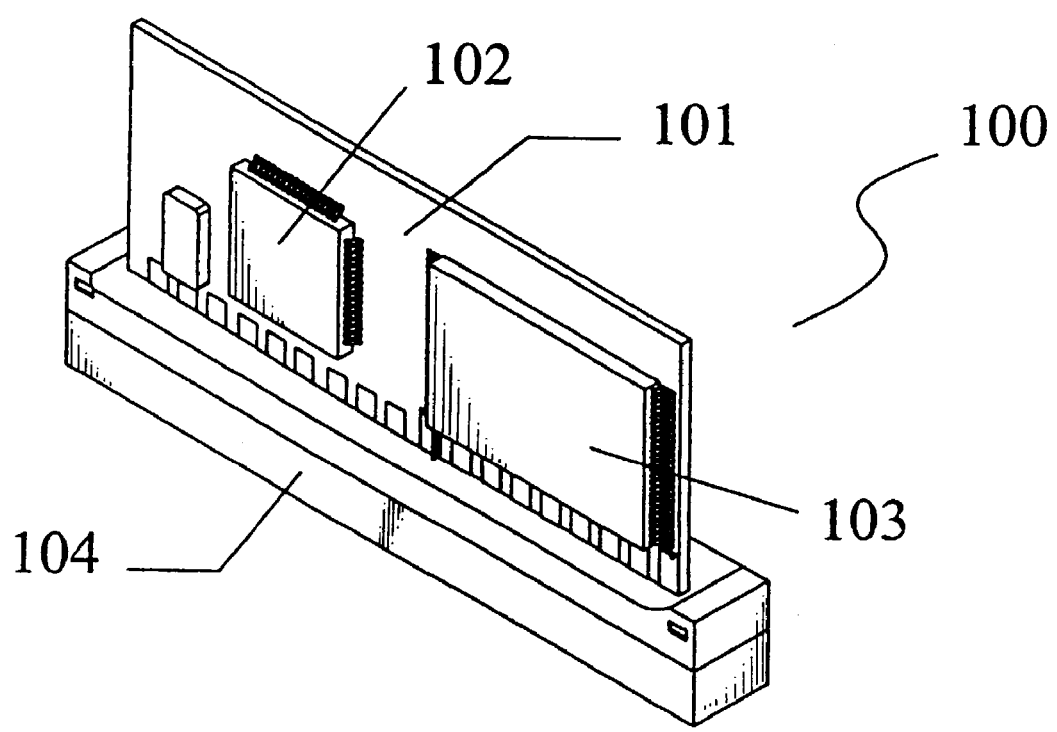
FIG. 3 is a perspective view of a SATA solid state disk on module according to the present invention.

Referring to FIG. 3, a physical solid state disk on module with high speed interface is illustrated. A SATA solid state disk on module 100 has a printed circuit board 101 attached with a SATA interface controller 102 and a data memory or a data memory array 103, which is coupled to the SATA interface controller 102. Further, a SATA interface connecting device 104 is coupled to the host such that the SATA solid state disk on module of the present invention and the system can be set up completely. In practice, the interface connecting device 104 is the SATA interface connector or gold contacts so that the SATA interface connecting device 10 can be adapted to the system based on the demand of the system.

While the invention has been described with reference to the a preferred embodiment thereof, it is to be understood that modifications or variations may be easily made without departing from the spirit of this invention, which is defined by the appended claims.

What is claimed is:

1. A solid state disk on module with high speed transmission for use with a system comprising:

a) a printed circuit board;
b) a memory array storing digital data and having a non-volatilized memory and a data memory array;
c) an SATA interface connecting device connected with the system; and
d) an SATA interface controller connected to the SATA interface connecting device and the memory array, the SATA interface controller selectively sending the digital data to the memory array and receiving stored data from the memory array, the SATA interface controller transmitting and receiving SATA signals to and from the system through the SATA interface connecting device, wherein the memory array, the SATA interface connecting device, and the SATA interface controller are located on the printed circuit board.

2. The solid state disk on module according to claim 1, wherein the non-volatilized memory is one of a MRAM and a FeRAM.

3. The solid state disk on module according to claim 1, wherein the non-volatilized memory is a temporary storage device of the SATA interface controller storing the digital data transmitted to the data memory array of the memory array increasing a speed of data transmission.

4. The solid stats disk on module according to claim 3, wherein, when the digital data is detected by the SATA interface controller, the SATA interface controller writes the digital data from the non-volatilized memory to the data memory array preventing data from being lost due to an interruption of power.

* * * * *